United States Patent
Pinto et al.

(10) Patent No.: US 7,856,729 B1
(45) Date of Patent: Dec. 28, 2010

(54) BORE ELEVATION AND AZIMUTH MEASURING APPARATUS AND METHOD

(75) Inventors: Robert P. Pinto, Dover, NJ (US); John F. Casper, Succasunna, NJ (US); Jeffrey Gregor, Troy, NY (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 115 days.

(21) Appl. No.: 12/187,561

(22) Filed: Aug. 7, 2008

Related U.S. Application Data

(60) Provisional application No. 60/954,887, filed on Aug. 9, 2007.

(51) Int. Cl.
*G01B 11/26* (2006.01)
*G01C 15/00* (2006.01)

(52) U.S. Cl. .................................. 33/286; 33/DIG. 21

(58) Field of Classification Search ................ 33/228, 33/286, 529, DIG. 21; 356/153
See application file for complete search history.

(56) References Cited

U.S. PATENT DOCUMENTS

| | | | | |
|---|---|---|---|---|
| 4,155,648 A | * | 5/1979 | Ferguson | 356/140 |
| 4,392,744 A | * | 7/1983 | Tatsuhama et al. | 356/153 |
| 4,459,757 A | * | 7/1984 | Lippuner et al. | 42/121 |
| 4,825,258 A | * | 4/1989 | Whitson | 356/153 |
| 5,007,175 A | * | 4/1991 | Schwarz | 33/286 |
| 5,204,483 A | * | 4/1993 | Tellechea | 42/95 |
| 5,446,535 A | * | 8/1995 | Williams | 356/153 |
| 5,461,793 A | * | 10/1995 | Melville | 33/286 |
| 6,295,753 B1 | * | 10/2001 | Thummel | 42/116 |
| 6,434,849 B1 | * | 8/2002 | Hermann | 33/529 |
| 6,482,101 B1 | * | 11/2002 | Posma | 473/246 |
| 7,155,834 B2 | * | 1/2007 | Palumbo et al. | 33/286 |
| 7,486,390 B2 | * | 2/2009 | Suing et al. | 356/153 |
| 7,665,218 B1 | * | 2/2010 | Pinto | 33/333 |
| 2002/0033940 A1 | * | 3/2002 | Hedges et al. | 356/141.4 |

FOREIGN PATENT DOCUMENTS

| | | | | |
|---|---|---|---|---|
| JP | 58179309 A | * | 10/1983 | |
| JP | 2605560 B2 | * | 4/1997 | |
| WO | WO 2007073650 A1 | * | 7/2007 | |

* cited by examiner

*Primary Examiner*—R. A. Smith
(74) *Attorney, Agent, or Firm*—John F. Moran

(57) ABSTRACT

A method for measuring the azimuth and elevation of the axis of a tube of other apparatus uses a centering mandrel inserted in the tube. The centering mandrel has a laser fixed to one end. The laser beam is aligned with the bore axis of the tube. A pair of optical instruments view two points on the laser beam. Using the optical instruments, horizontal and vertical angles from one optical instrument to the other, and vice versa, are measured. Also, horizontal and vertical angles from each optical instrument to each of the two points are measured. Using the three sets of measured angles, the azimuth and the elevation of the bore axis are calculated.

22 Claims, 7 Drawing Sheets

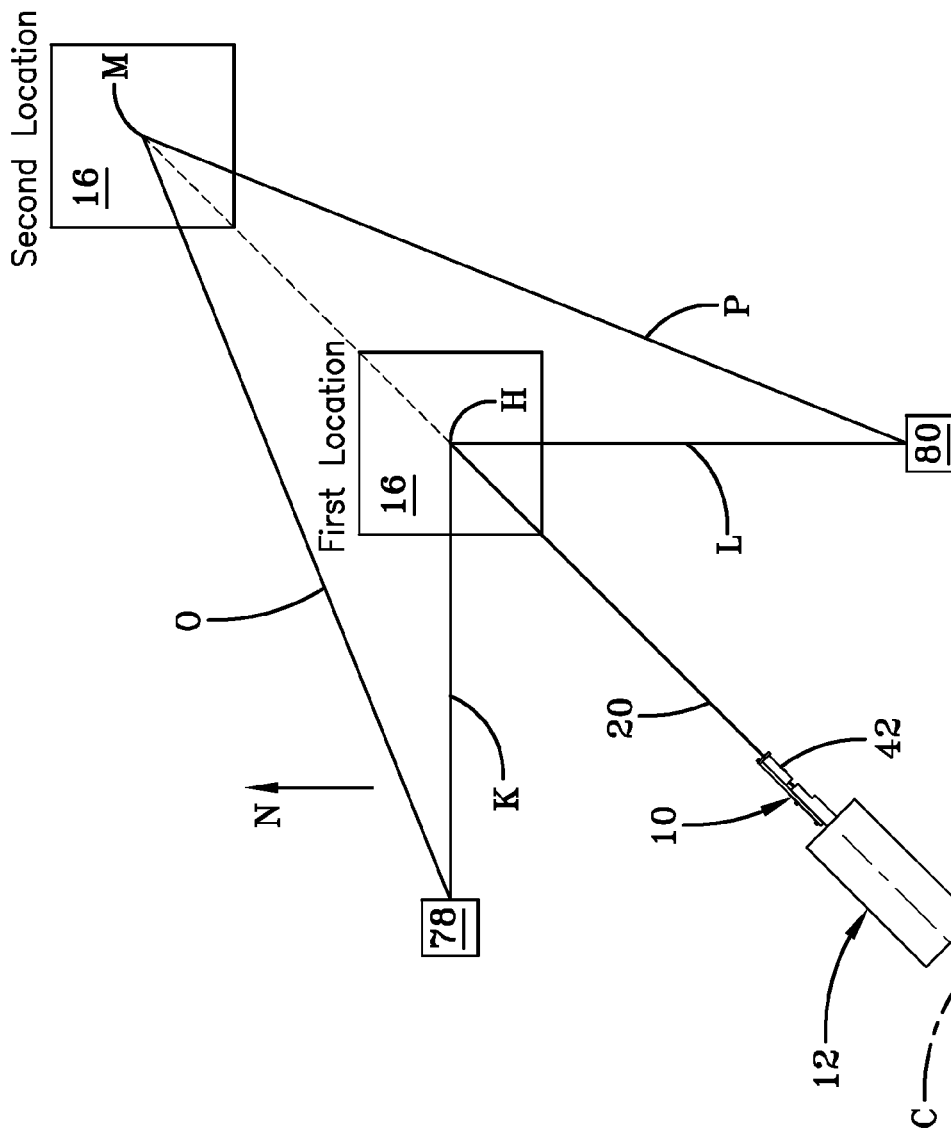

BORE ELEVATION AND AZIMUTH MEASURING APPARATUS AND METHOD

STATEMENT OF GOVERNMENT INTEREST

The inventions described herein may be manufactured, used and licensed by or for the U.S. Government for U.S. Government purposes.

CROSS-REFERENCE TO RELATED APPLICATIONS

This application claims the benefit under 35 USC 119(e) of U.S. provisional patent application No. 60/954,887 filed on Aug. 9, 2007, which application is hereby incorporated by reference. This application is related to application Ser. No. 12/055,533, filed on Mar. 26, 2008, entitled "Azimuth Measuring Apparatus and Method", having the same assignee as this application.

BACKGROUND OF THE INVENTION

The invention relates in general to measuring devices and in particular to devices for measuring the elevation and azimuth of a tube, such as a gun tube.

Verifying the pointing accuracy of an artillery cannon, mortar tube, or other equipment in an engineering environment has been and continues to be a problem. A theodolite has been used to measure the azimuth of an artillery cannon, mortar tube, or other equipment. U.S. Pat. No. 5,225,626 issued on Jul. 6, 1993 to Bowers discloses another arrangement for measuring the azimuth of a tube.

Shortcomings of these approaches are the inability to quantify or calibrate the apparatus and to establish or remove bias from the measurement. Additionally, the use of a single optical instrument, such as a theodolite, to align to a projection of a tube axis is a subjective process and highly dependent upon the skill of the theodolite operator. Further, the prior devices may measure azimuth, but not elevation angle.

SUMMARY OF THE INVENTION

One aspect of the invention is an apparatus for measuring the azimuth and elevation of a tube. The apparatus may include a centering mandrel having a longitudinal axis, and a laser fixed to the centering mandrel and aligned therewith. The centering mandrel may include at least one lobe assembly. The at least one lobe assembly may comprise at least three lobes. At least one lobe may include a resilient member for contacting the tube. At least two lobes may include non-marring portions for contacting the tube.

The apparatus may further include a support member fixed at one end to the centering mandrel and at another end to the laser. The longitudinal axis of the support member may be substantially coincident with the longitudinal axis of the centering mandrel. A second support member may be fixed at one end to the centering mandrel and a third support member may be fixed at one end to another end of the second support member.

Another aspect of the invention is a method for measuring the azimuth and elevation of a tube. The method may include inserting the apparatus described above into the tube; projecting a laser beam that is parallel or coaxial with the bore axis of the tube; viewing first and second points of the laser beam using a pair of optical instruments; measuring horizontal and vertical angles from one optical instrument to the other, and vice versa; measuring horizontal and vertical angles from each optical instrument to each of the first and second points, respectively; and calculating the azimuth and the elevation of the bore axis based on the measured angles.

The method may include calibrating the apparatus. Calibrating may include aligning a laser aperture with the bore axis and aligning the laser beam with the bore axis.

It is an object of the invention to provide a method and apparatus for measuring the azimuth and elevation of a tube.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 6 illustrates adjustment of the laser beam.

FIG. 7 schematically shows the measuring method.

DETAILED DESCRIPTION OF THE PREFERRED EMBODIMENTS

The invention is useful, for example, for measuring the azimuth and/or elevation of an artillery cannon, mortar gun tube, or other type of equipment, whether military or civilian. The inventive apparatus may be inexpensively fabricated, its calibration may be easily verified, and if needed, it may be re-calibrated in a field environment.

Figure 1:
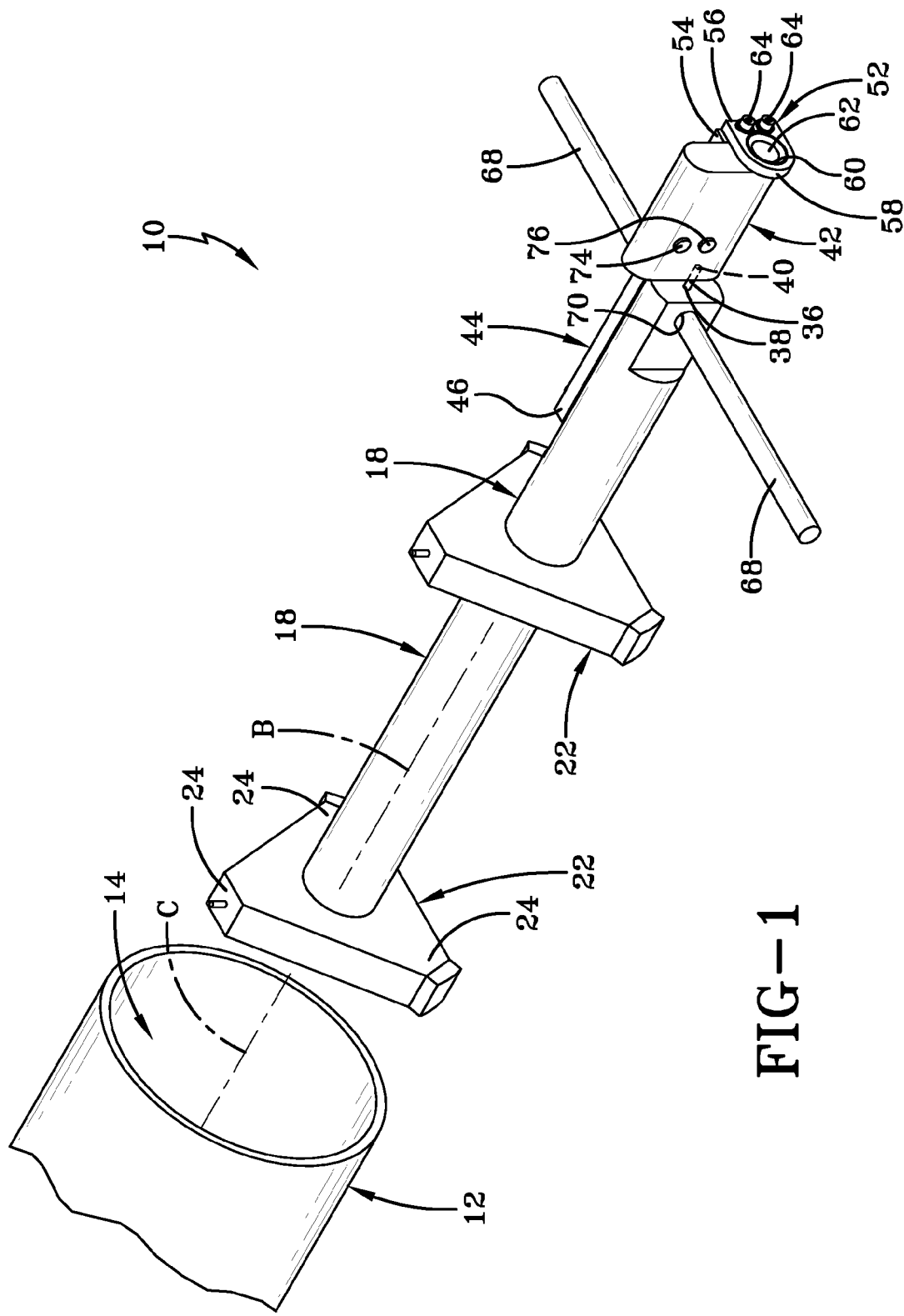
FIG. 1 is a perspective view of one embodiment of the invention in relation to a bore.

FIG. 1 shows one embodiment of an apparatus 10 for measuring the azimuth and/or elevation of a tube 12 having a bore 14. Bore 14 has a bore axis C. Tube 12 may be any type of tube and is not limited to munitions. Apparatus 10 includes a centering mandrel 18 having a longitudinal axis B. The centering mandrel 18 is centered in bore 14. Mounted on mandrel 18 is at least one lobe assembly 22. Lobe assembly 22 may include at least three lobes 24 arranged radially from the longitudinal axis B of the mandrel 18. The lobes 24 contact the interior bore wall and are dimensioned such that they center the mandrel 18 and align it with the bore axis C. Tubes 12 with different inside diameters may require different size lobe assemblies 22.

Figure 2:
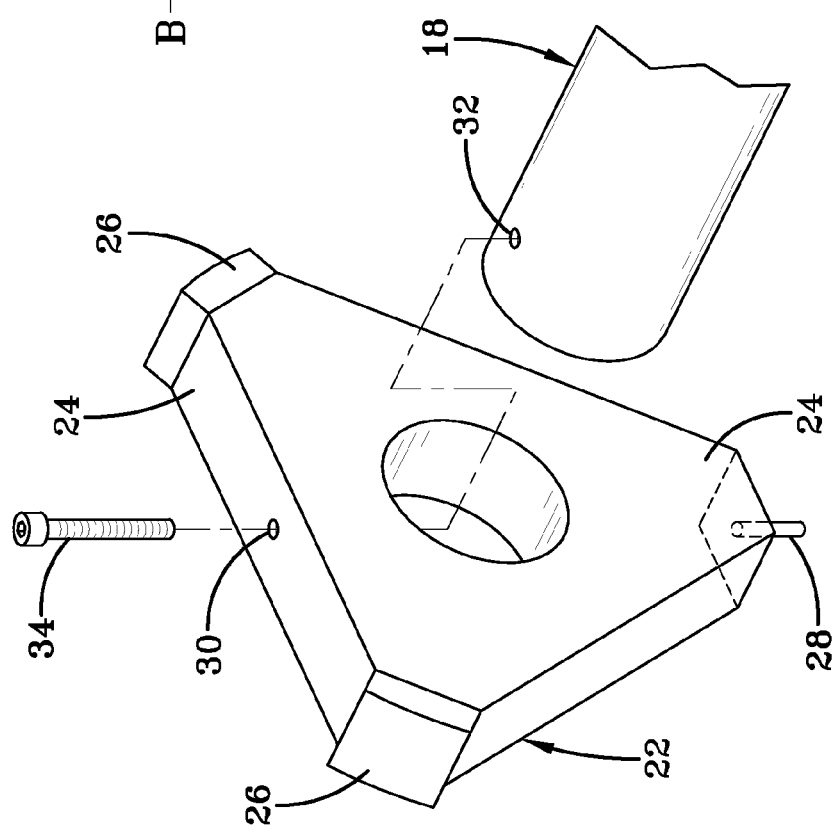
FIG. 2 is an exploded perspective view of a lobe assembly.

FIG. 2 is an exploded perspective view of a lobe assembly 22. One or more lobes 24 may include a resilient member 28, such as a spring or spring loaded plunger that contacts the interior wall of the bore 14 so that the spring force maintains contact of the lobes 24 with the bore wall. If a lobe 24 does not include a resilient member 28, then a non-marring surface 26, such as brass, may be fixed to the lobe where the lobe contacts the bore wall. Lobe assembly 22 may be fixed to mandrel 18 using, for example, a fastener 34 that fits in a bore 30 in lobe assembly 22 and a threaded hole or threaded insert 32 in mandrel 18.

Preferably, a second lobe assembly 22 (FIG. 1) is included at a location that is axially displaced from the first lobe assembly to thereby maintain the axis B of the mandrel 18 coaxial with the bore axis C.

Referring to FIG. 1, support member 36 is fixed at one end 38 to the centering mandrel 18 and at another end 40 to a laser 42. The longitudinal axis of the support member 36 is substantially coaxial or coincident with the longitudinal axis B of the centering mandrel 18. In one embodiment, the end 40 of support member 36 may include a threaded portion that threads into an opening (not shown) in the base of laser 42.

Figure 3:
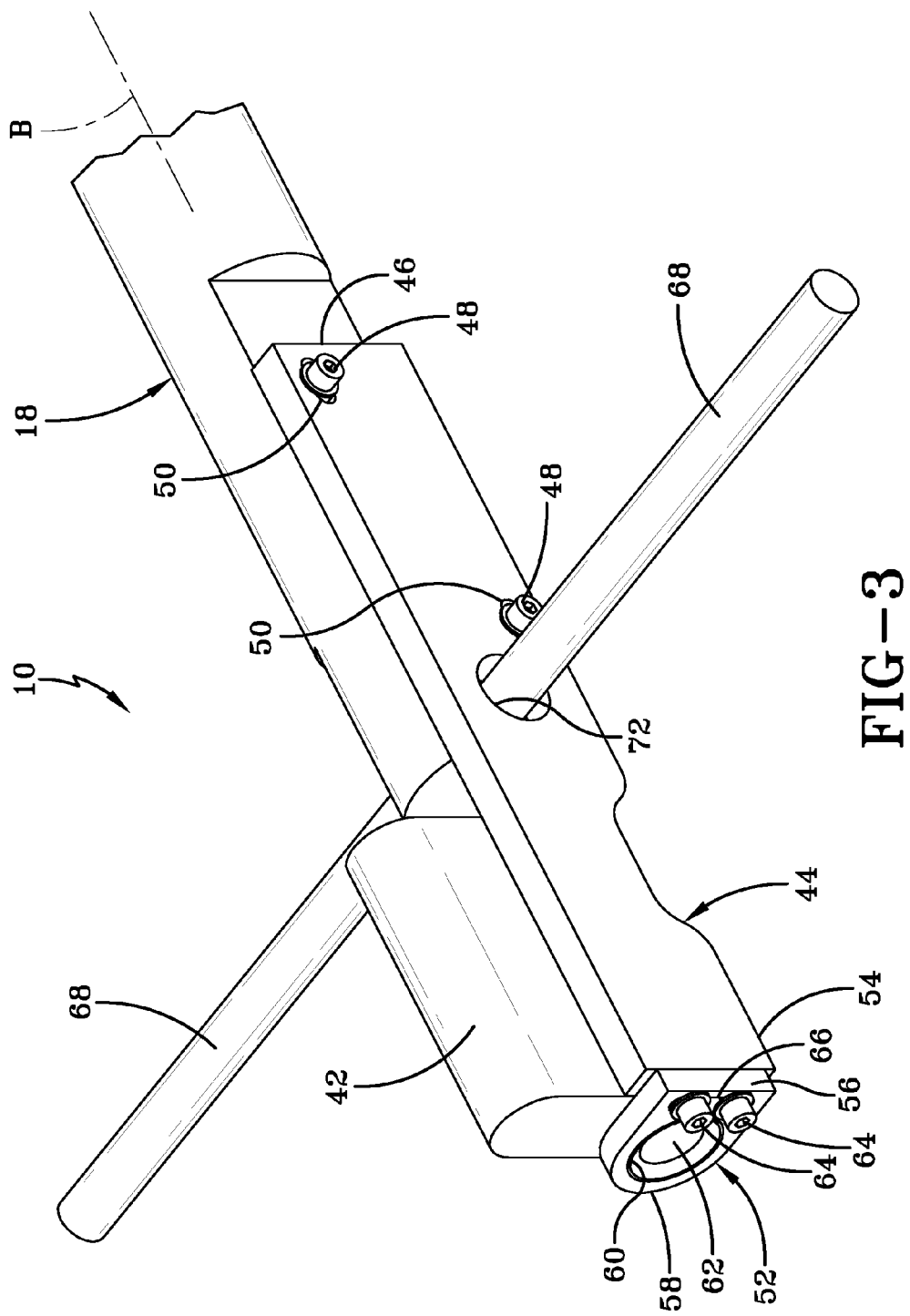
FIG. 3 is an enlarged view of a portion of FIG. 1.

FIG. 3 is an enlarged view of the upper portion of apparatus 10. In FIG. 3, apparatus 10 has been rotated about axis B 180 degrees from its position in FIG. 1, and the view in FIG. 3 is from the front end of the apparatus 10. A second support member 44 is fixed at one end 46 to mandrel 18. Second support member 44 is adjustable with respect to the centering mandrel in two orthogonal axes. For example, in FIG. 3 support member 44 is fixed to mandrel 18 using fasteners 48, such as bolts, that thread into openings (not shown) in mandrel 18.

Figure 4:
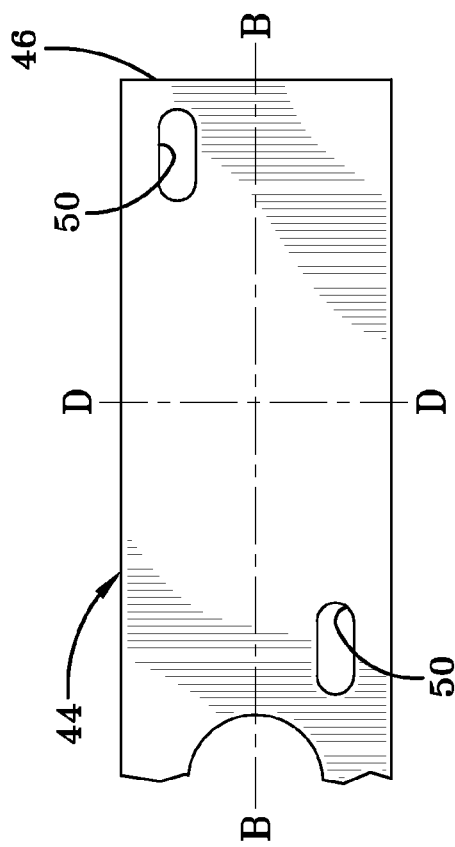
FIG. 4 is a side view of a support member.

The openings 50 in member 44 for fasteners 48 may be slots such that member 44 may be moved in two mutually orthogonal axes with respect to mandrel 18. FIG. 4 is a side view of end 46 of member 44 showing exemplary openings 50. Openings 50 allow movement of the shaft portion of fasteners 48 along the axis B of the mandrel 18 and more limited movement along axis D, which is perpendicular to axis B. Fasteners 48 may be capscrews and may include flat washers and lock washers (not shown). The flat washer allows the fastener head to bridge the slot 50 and the lock washer helps hold the fastener 48 in place during the adjustment process.

Referring again to FIG. 3, a third support member 52 is fixed at one end 56 to an end 54 of the second support member 44. The third support member 52 includes an opening 60 that fits around the laser aperture 62 of laser 42. The third support member 52 is adjustable with respect to the second support member 44 in two orthogonal axes. Support member 52 is fixed to support member 44 using fasteners 64, for example, threaded bolts that bolt into openings (not shown) in the end 54 of member 44. The opening 66 in member 52 for fasteners 64 may be a slot such that member 52 may be moved in two mutually orthogonal axes with respect to member 44.

Figure 5:
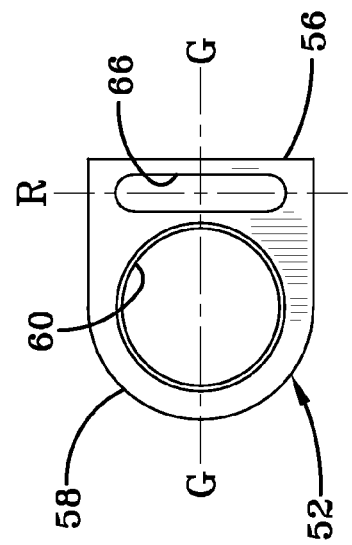
FIG. 5 is an end view of another support member.

FIG. 5 is an end view of member 52 showing an exemplary slot 66. Slot 66 allows movement of member 52 relative to member 44 along the axis R, and allows more limited movement along the axis G. Axes R and G are perpendicular to each other and to the bore axis C. Fasteners 64 may be capscrews and may include flat washers and lock washers (not shown). The flat washer allows the fastener head to bridge the slot 66 and the lock washer helps hold the fastener 64 in place during the adjustment process.

Preferably, the centering mandrel 18 includes a handle 68 (FIGS. 1 and 3) for rotating the apparatus 10. Handle 68 may comprise a rod that extends through an opening 70 (FIG. 1) in mandrel 18 and an opening 72 (FIG. 3) in member 44.

Many types of lasers may be suitable for use in apparatus 10. An example of a suitable laser 42 is the Laser Boresight System manufactured by Insight Technology Incorporated, Londonderry, N.H. Laser 42 may include laser beam adjustments 74, 76 (FIG. 1) for adjusting the laser beam in two mutually orthogonal axes. The laser beam adjustments 74, 76 may be integral with the laser 42.

To calibrate the apparatus 10, the mandrel 18 is inserted in the bore 14 of a tube 12 or fixture. The tube 12 may be, but not need be, the tube for which it is desired to measure the elevation and azimuth. Mandrel 18 may be inserted into bore 14 until handle 68 is near the end of tube 12. The action of the resilient members 28 (FIG. 2) on the lobe assemblies 22 will align the axis B of the mandrel 18 with the axis C of the bore 14. The laser 42 is then mechanically adjusted so that the laser housing is aligned with the axis B of the mandrel 18, and, therefore, the axis C of the bore 14.

Laser 42 may be mechanically adjusted by centering the laser aperture 62 on the axis C of bore 14. A dial indicator (not shown), or similar instrument may be used in a known manner to measure the run out of the laser aperture 62 as the apparatus 10 in rotated in tube 12 using handle 68. Apparatus 10 may be rotated in 180 degree increments. Adjustments may be made to the position of laser 42 in two axes that are orthogonal to the axis C of the bore 14, until the run out of the laser aperture 62 is substantially zero.

The adjustments may be made by loosening fasteners 64 (FIG. 3) and moving support member 52 along axes R and G (FIG. 5). Adjustments may also be made by loosening fasteners 48 (FIG. 3) and moving support member 44 along axis D (FIG. 4). Movement of support member 44 along axis D and movement of support member 52 along axis R is generally movement in the vertical direction, but member 52 may provide finer control of motion. Movement of support member 44 along axis B (FIG. 4) may be needed to ensure that laser 42 is tightly encased between support member 36 (FIG. 1) and support member 52.

The above-described adjustments align the laser aperture 62 with the axis C of the bore 14. The laser beam itself must also be aligned. Referring to FIG. 6, the laser beam may be imaged on any convenient reflective surface 16 that will serve as a screen. The center I of the first laser spot is noted. The apparatus 10 is then rotated in the tube 12 or fixture 180 degrees, and the center J of the second laser spot is noted. Any motion of the laser spot may be offset by adjusting the two angular controls 74, 76 (FIG. 1) on the laser 42.

The controls 74, 76 are used to move the laser 42 half the distance from the second spot (J) location to the first spot (I) location. For example, in FIG. 6, the controls 74, 76 may used to move the laser 42 horizontally to the left a distance of b/2, and vertically downward a distance of c/2. This process may be repeated until there is no apparent motion of the laser spot, at which time the laser beam will be coaxial with the axis C of tube 12. To accurately determine the first and second positions of the laser spot, an optical instrument, for example, a theodolite may be used.

Alignment of the laser beam may be verified by moving the reflective surface 16 to another location along the laser beam and repeating the process. It may be possible that, if the laser aperture 62 is not centered on the apparatus 10, some laser beam motion will always be observed. In that case, the relative motion of the laser spot will be substantially the same at any two distances, indicating that the laser beam is parallel to the axis C of the tube 12. This is an acceptable condition.

Now that the apparatus 10 is calibrated, it may be used to measure the azimuth and elevation of tube 12, or it may be removed from tube 12 and inserted into another tube for which the azimuth and elevation may be measured. Referring to FIG. 7, with the tube 12 positioned at the azimuth and elevation of interest, the laser beam 20 extends as a projection of the bore axis C and is viewed on any convenient reflective surface 16 at laser spot or point H. Two optical instruments, for example, theodolites 78, 80 are situated so they may directly view the laser spot H and each other. The theodolites 78, 80 are referenced to a common angular system, such as north, denoted by arrow N, from which all horizontal measurements are referenced. Additionally, theodolites 78, 80 are each referenced to the local horizontal plane using conventional methods.

At each theodolite 78, 80, measurements are made of the horizontal and vertical angles between the two theodolites 78, 80. In addition, at each theodolite 78, 80 measurements are made of the horizontal and vertical angles between the theodolite and the laser point H, along lines K and L, respectively. The reflective surface 16 is then placed at a second location, which may be further or closer along the laser beam path than the first location. In FIG. 7, the second location is further away from the laser 42 than the first location.

At the second location, the laser beam makes a spot or point M on screen 16. Horizontal and vertical angular measurements of spot M are made from theodolites 78, 80 along lines O, P, respectively. There are three sets of angular data. They are: 1) the horizontal and vertical angles of the theodolites 78, 80 measured to each other; 2) the horizontal and vertical angles measured from each theodolite to point H; and 3) the horizontal and vertical angles measured from each theodolite to point M. From these three sets of angular data, one may compute three dimensional positions of the points H and M, referenced to an orthogonal coordinate system in which the reference direction N and the horizontal are the principal axes, and having dimensions that are proportional to the horizontal distance between the theodolites 78, 80.

Once the three dimensional coordinates of points H and M are known, one may compute the azimuth of the line (H-M) between points H and M, relative to reference direction N. One may also compute the vertical angle of line H-M, relative to the horizontal. Because line H-M is a projection of the bore axis C, the azimuth and vertical angle of the line H-M is also the azimuth and vertical angle of the tube 12. The computations may be performed manually, or automated via a spreadsheet or computer program.

In addition, if the two theodolites 78, 80 are used to measure the position of two points separated by a known distance, then the three-dimensional coordinates may be scaled using the known distance between the two points. All other measurements may also be scaled by this same known distance. Therefore, it becomes possible to compute the distance between any two points measured. Furthermore, if a measurement is made to a single known geodetic survey point, the location of the single known geodetic survey point relative to the theodolite's coordinate system may be computed. Then, all points may be further scaled into a real-world coordinate system.

Should there be doubt as to the accuracy of the calibration of the apparatus 10, an additional measurement technique may be used. The apparatus 10 may be rotated in the tube 180-degrees, a second set of measurements of points H and M taken (as described above), and a second azimuth and elevation calculated. The average of the two calculated azimuths and the average of the two calculated elevation angles will be the actual azimuth and elevation of the bore axis C.

A method of calculating the azimuth and elevation angle will now be described. A theodolite can accurately measure horizontal and vertical angles. Typically, the horizontal angle is referenced to a known standard, such as north, and the vertical angle is referenced to a horizontal plane. Used in optical metrology and land surveying applications for decades or even centuries, a theodolite may be oriented to a known azimuth reference by means of prior survey and is a well-established procedure. Modern theodolites can even provide their own internal north-seeking reference. In any case, the accurate emplacement and operation of a theodolite is a well-established procedure and will not be explained in-depth as part of this patent.

A theodolite measures a horizontal angle from a fixed reference, where the measurement angle increases in a clockwise direction as viewed from above. A theodolite also measures a vertical angle, where zero is directly over the instrument, 90-degrees is in a level plane in front of the instrument, 180-degrees is directly below the instrument, and 270-degrees is in a level plane behind the instrument. These standard measurement conventions are used in the description.

A single theodolite can measure the horizontal angle and vertical angle to a specific laser point falling on a screen. The additional variable needed to define a vector is the magnitude or distance from the theodolite to the point. By use of a second theodolite, the magnitude of the distance from the first theodolite to the laser point may be determined in terms of an angle. By using the opposing theodolite to establish the magnitude, a vector from each theodolite to any point may be established. Once this vector is established, as for any vector, it can be resolved into x, y, and z components in a three-dimensional coordinate system.

By making the same type of theodolite measurements to another point falling on a screen at another location along the laser beam, another set of x, y, and z points may be established. These two sets of three-dimensional coordinates establish a vector in-itself along the laser beam from one point to another. From the two sets of three-dimensional coordinates, the azimuth and elevation of that vector, and therefore the azimuth and elevation of the bore may be determined. Many mathematical methods may be used to determine these vectors. A straightforward approach will be presented herein. As a labeling convention, all horizontal angles will be designated by an "H", vertical angles by a "V", distances by a "D", and the two theodolites shall be referenced as T1 and T2, respectively.

Figure 8:
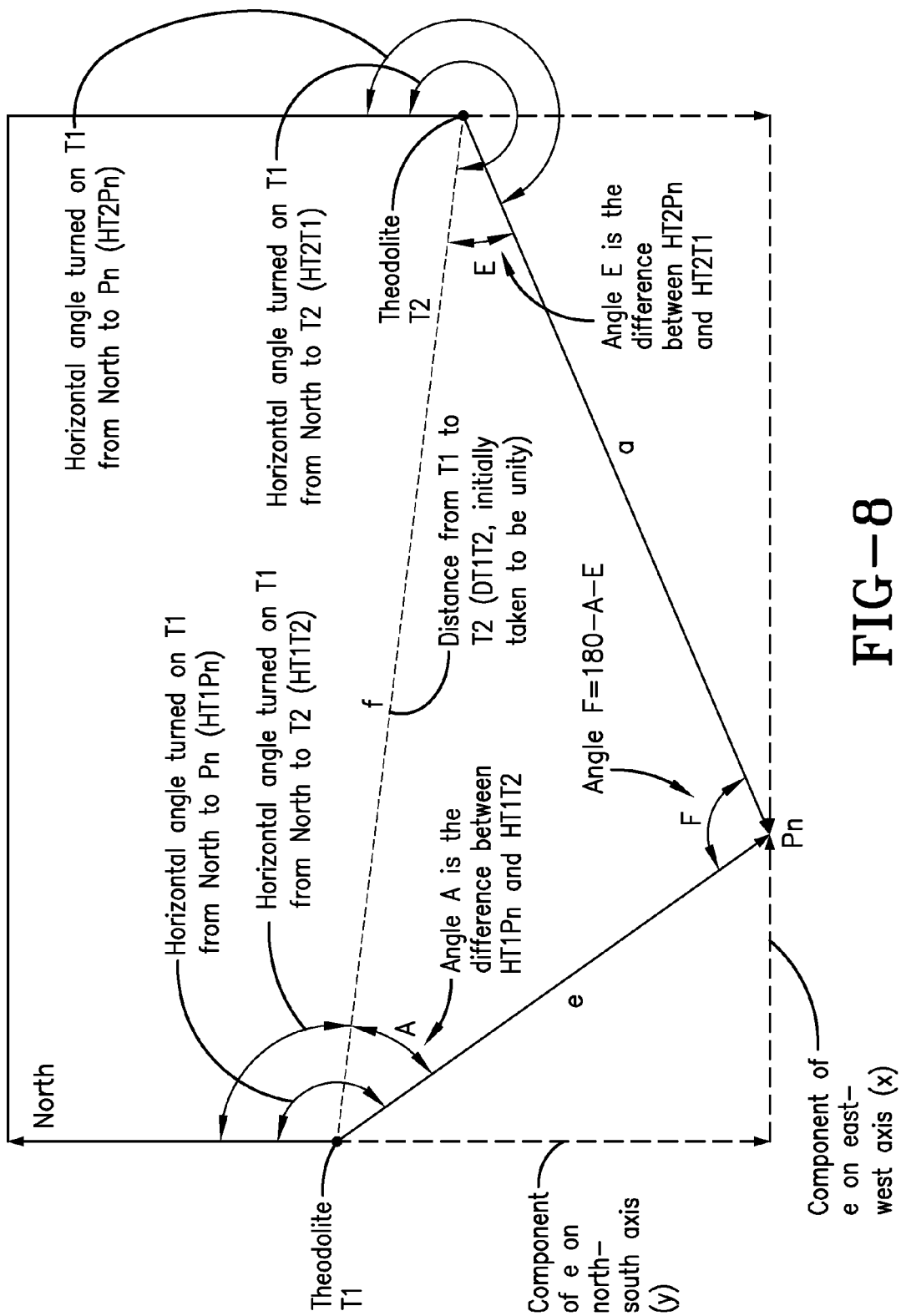
FIG. 8 is a top, schematic view of the two theodolites of FIG. 9, showing the horizontal angles measured to a single point.
Figure 9:
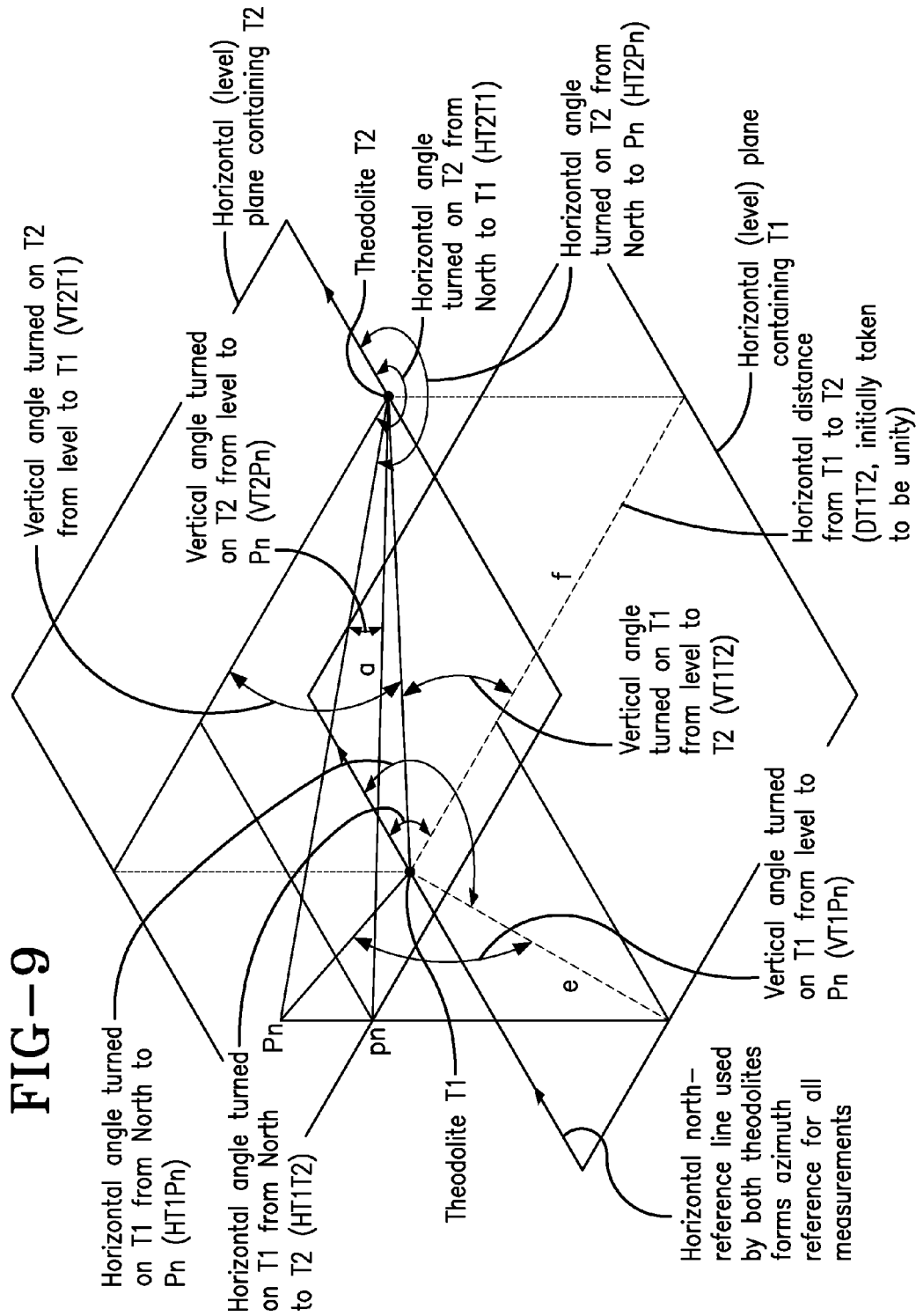
FIG. 9 is a perspective, schematic view of the two theodolites of FIG. 8, showing the horizontal and vertical angles measured to a single point.

FIG. 8 shows a top view of two theodolites, T1 and T2, each oriented to a north reference and measuring horizontal angles to a single point, Pn. As best seen in FIG. 9, theodolites T1 and T2 are in different horizontal planes. Theodolites T1, T2 and point Pn form triangle aef with sides a, e, and f. Sides e and f are in the horizontal plane of T1, and side a is in the horizontal plane of T2. When viewed from above, as in FIG. 8, the three sides a, e, f appear to form a triangle. Because each theodolite can measure the horizontal angle to the other theodolite, two of the interior angles of triangle aef can be established.

As shown in FIG. 8, angle A is equal to HT1Pn minus HT1T2, and angle E is equal to HT2T1 minus HT2Pn. Angle F is therefore equal to 180-degrees minus angle A minus angle E. Because the three interior angles are now established, the Law of Sine's may be used to establish the relative magnitude of each of the sides of the triangle. Because the distance between the theodolites, DT1T2, is a constant, it is assigned the value of unity, and all subsequent distances that are derived are scaled to DT1T2.

From the Law of Sine's $a/SIN(A)=e/SIN(E)=f/SIN(F)$. Therefore, $e=[(1)/SIN(F)]*SIN(E)$, and $a=[(1)/SIN(F)]*SIN(A)$. Thus, the relative magnitude of all sides of the triangle are known. Because the angles are measured from north reference, the vector e from theodolite T1 to point Pn can be resolved into components along the north-south and east-west axes, namely, $e\ COS(HT1Pn)$ and $e\ SIN(HT1Pn)$, respectively. Additionally, by a similar process not shown in FIG. 8, the x and y components of the vector between T1 and T2 may be established, and the components of vector a may also be computed. When those two sets of components are combined, they result in the same x-y position for point Pn as computed from vector e, thus providing an indication of the accuracy of the angular measurements.

To establish the three-dimensional position of point Pn, the vertical angles measured by the theodolites T1, T2 need to be evaluated. FIG. 9 is a perspective, schematic view of the theodolites T1 and T2 of FIG. 8. In FIG. 9, T2 is at a higher altitude than T1. From FIG. 9, the vertical position of Pn on the z-axis is computed as the magnitude of vector e multiplied by the tangent of the vertical angle from T1 to Pn, or z=e TAN(VT1Pn). Keep in mind that when looking in a horizontal plane, the theodolite will indicate 90-degrees or 270-degrees, and the appropriate value must be subtracted from the measurement to get the true angle above or below the horizontal plane.

FIG. 9 also shows how the same vertical measurement may be made from theodolite T2. When measuring from T2, the vertical position of Pn will be relative to the horizontal plane of T2. Therefore, the vertical position of point pn, which is in the plane of T2, must be included. The z-axis position of Pn above pn is equal to the magnitude of side a times TAN (VT2Pn). The additional vertical distance is distance between the two horizontal planes of the theodolites T1, T2. This additional vertical distance is computed from the vertical angles between T1 and T2, and the horizontal distance between them, which is DT1T2. As previously stated, DT1T2 is equal to f, which is given the value of unity. Therefore, the height of T2 is 1*TAN(VT1T2), and the z-axis value of Pn is TAN(VT2Pn)+TAN(VT1T2).

Figure 10:
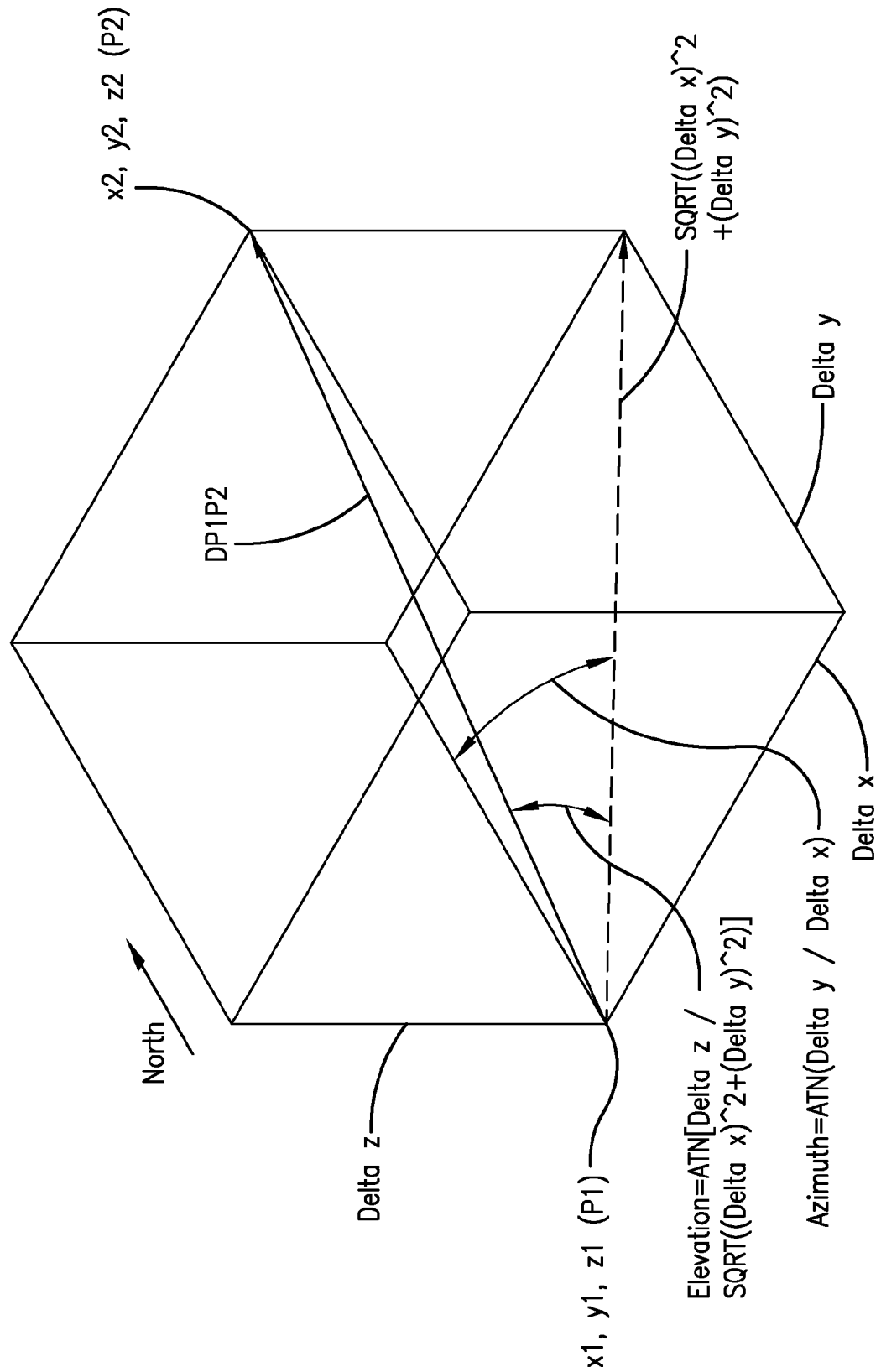
FIG. 10 illustrates the conversion from Cartesian coordinates to polar coordinates for two points measured along a laser beam.

After determining the x, y, and z coordinates for two points, P1 and P2, along the path of the laser beam 20, the azimuth and elevation of the line they define may be computed. This is a simple matter of converting a vector quantity from a Cartesian to polar coordinate system. FIG. 10 illustrates the conversion from Cartesian coordinates to polar coordinates. The magnitude of the distance between the points P1 and P2 is the square root of the sum of the squares of the delta values, or DP1P2=SQRT[(Delta x)$^2$+(Delta y)$^2$+(Delta z)$^2$]. The azimuth of the line P1P2 is the arctangent of the delta x and delta y values, or ATN(Delta y/Delta x). The elevation angle is computed by taking the arctangent of the delta z value divided by the magnitude of the vector in the horizontal plane, or ATN[Delta z/SQRT((Delta x)$^2$+(Delta y)$^2$)].

As previously mentioned, because the distance from theodolite T1 to theodolite T2 is a constant, and assumed to be unity, the x, y, and z coordinates of any point Pn are scaled proportionally to that distance. However, by making measurements of two points P1 and P2 that are a known distance apart, one may compute a scale constant. The scale constant is equal to the known fixed distance divided by the computed P1 to P2 distance. When the scale factor is applied to subsequent Pn measurements, the x, y, and z coordinates may be output in the measured unit, for example, inches, feet, meters, etc.

Additionally, theodolites T1 and T2 may be used to measure angles for a point Pn for which survey data is known, such as an Easting, Northing, and Altitude. The computed x, y, and z coordinate information for the initial point Pn may be applied as offsets to the measurements of other points. In that case, the subsequent x, y, and z coordinates are output in terms of Easting, Northing, and Altitude.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for measuring an azimuth and an elevation of a tube having a bore axis, comprising:
   a centering mandrel having a longitudinal axis; and
   a laser fixed to the centering mandrel and aligned therewith, a second support member fixed at one end to the centering mandrel and a third support member fixed at one end to another end of the second support member, and
   a support member fixed at one end to the centering mandrel and at another end to the laser, a longitudinal axis of the support member being substantially coincident with the longitudinal axis of the centering mandrel.

2. The apparatus of claim 1, wherein the centering mandrel includes at least one lobe assembly.

3. The apparatus of claim 2, wherein the at least one lobe assembly comprises at least three lobes, at least one lobe including a resilient member for contacting the tube.

4. The apparatus of claim 3, wherein at least two lobes including non-marring portions for contacting the tube.

5. The apparatus of claim 2, wherein the centering mandrel includes two lobe assemblies.

6. The apparatus of claim 5, wherein the centering mandrel includes a handle for rotating the centering mandrel.

7. The apparatus of claim 1, wherein the third support member includes an opening that fits around a laser aperture housing.

8. The apparatus of claim 7, wherein the second support member is adjustable with respect to the centering mandrel in two orthogonal axes.

9. The apparatus of claim 1, wherein the third support member is adjustable with respect to the second support member in two orthogonal axes.

10. The apparatus of claim 1, wherein the laser includes adjustments in two orthogonal axes for adjusting a laser beam position.

11. The apparatus of claim 1 wherein the centering mandrel is rotatable through 360 degrees in the tube.

12. A method for measuring an azimuth and an elevation of a tube having a bore axis, comprising:
   inserting the apparatus of claim 1 in the tube;
   projecting a laser beam that is one of parallel and coaxial with the bore axis;
   viewing first and second points of the laser beam using a pair of optical instruments;
   using the optical instruments, measuring horizontal and vertical angles from one optical instrument to the other, and vice versa, and measuring horizontal and vertical angles from each optical instrument to each of the first and second points, respectively; and
   calculating the azimuth and the elevation of the bore axis based on the measured angles.

13. The method of claim 12, further comprising calibrating the apparatus.

14. The method of claim 13, wherein calibrating includes aligning a laser aperture with the bore axis and aligning the laser beam with the bore axis.

15. The method of claim 14, wherein aligning the laser aperture with the bore axis includes adjusting at least one support member that supports the laser.

16. The method of claim 15, wherein aligning the laser aperture with the bore axis includes measuring run out of the laser aperture.

17. The method of claim 14, wherein aligning the laser beam with the bore axis includes adjusting the position of the laser beam using adjustments that are integral with the laser.

18. The method of claim 17, wherein aligning the laser beam with the bore axis includes determining a movement of a laser spot at different distances from the laser.

19. The method of claim 12, wherein a distance between the first and second points is a known distance, the method further comprising scaling coordinates of any point using the known distance.

20. The method of claim 12, wherein survey data for a point is known, the method further comprising scaling coordinates of any point using the known survey data.

21. The method of claim 12, further comprising rotating the apparatus of claim 1 180-degrees in the tube and then, using the optical instruments, measuring second horizontal and second vertical angles from each optical instrument to each of the first and second points, respectively.

22. The method of claim 21, further comprising, calculating the azimuth and the elevation of the bore axis based on the measured angles and the second measured angles.

* * * * *